(12) United States Patent
Acevedo-Aviles et al.

(10) Patent No.: US 7,774,383 B2
(45) Date of Patent: Aug. 10, 2010

(54) DISPLAYING FACET TREE ELEMENTS AND LOGGING FACET ELEMENT ITEM COUNTS TO A SEQUENCE DOCUMENT

(75) Inventors: Joel C. Acevedo-Aviles, Gurabo, PR (US); Mario Gerald Ceste, Jr., Herndon, VA (US); John Hans Handy-Bosma, Cedar Park, TX (US); J. Christopher Hawley, Montrose, PA (US); Raymond Lee, Montpelier, VT (US); Matthew Norman Roy, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 11/136,658

(22) Filed: May 24, 2005

(65) Prior Publication Data
US 2006/0288039 A1 Dec. 21, 2006

(51) Int. Cl.
*G06F 3/01* (2006.01)
(52) U.S. Cl. ............... 707/805; 707/956; 707/E17.005; 715/760; 715/866; 715/968
(58) Field of Classification Search ............ 707/4, 707/10, 101.4; 715/513, 500
See application file for complete search history.

(56) References Cited

U.S. PATENT DOCUMENTS

| | | | | |
|---|---|---|---|---|
| 5,903,902 A | * | 5/1999 | Orr et al. ............... | 715/202 |
| 5,933,822 A | | 8/1999 | Braden-Harder et al. ....... | 707/5 |
| 5,956,737 A | * | 9/1999 | King et al. .................. | 715/517 |
| 6,169,986 B1 | | 1/2001 | Bowman et al. | |
| 6,285,366 B1 | * | 9/2001 | Ng et al. .................... | 715/853 |
| 6,327,628 B1 | * | 12/2001 | Anuff et al. ................. | 719/311 |
| 6,430,571 B1 | * | 8/2002 | Doan et al. .................. | 1/1 |
| 6,442,566 B1 | * | 8/2002 | Atman et al. ................ | 1/1 |

(Continued)

OTHER PUBLICATIONS

Priss, Uta., "Faceted Knowledge Representation", Dec. 5, 2000, Linkoping University Electronic Press, Linkoping Electronic Articles in Computer and Information Science, pp. 1-14.*

(Continued)

*Primary Examiner*—Pierre M Vital
*Assistant Examiner*—Christopher P Nofal
(74) *Attorney, Agent, or Firm*—Yee & Associates, P.C.; William H. Steinberg; Rudolf O. Siegesmund

(57) ABSTRACT

A set of programs is disclosed comprising a web display interface program (WIP), a Display Configuration Program (DCP) and a Sequence Logging Program (SLP). Responsive to user actions, the set of programs provide instructions to a server connected to storage containing a facet tree database and a rules database. The WIP comprises a user interface and a set of servlets that read the facet element to be displayed from the facet tree database, and based upon the user characteristics, acquire the appropriate display rules for the user from the rules database. The DCP allows an administrator to select or configure rules that will establish views for different end users that are tailored to those particular end users. The SLP allows end users to navigate through a set of facets using a standard faceted search, or using a previously constructed sequence of facets, and logs the user choices for later use.

15 Claims, 4 Drawing Sheets

U.S. PATENT DOCUMENTS

| | | | |
|---|---|---|---|
| 6,519,586 B2* | 2/2003 | Anick et al. | 707/3 |
| 6,668,251 B1 | 12/2003 | Goldberg | 707/5 |
| 6,678,679 B1 | 1/2004 | Bradford | 707/5 |
| 6,766,316 B2 | 7/2004 | Caudill et al. | 707/3 |
| 6,768,997 B2* | 7/2004 | Schirmer et al. | 1/1 |
| 6,789,076 B1 | 9/2004 | Dutta | 707/5 |
| 6,925,608 B1* | 8/2005 | Neale et al. | 715/763 |
| 7,146,362 B2* | 12/2006 | Allen et al. | 707/5 |
| 7,219,102 B2* | 5/2007 | Zhou et al. | 707/101 |
| 7,392,250 B1 | 6/2008 | Dash et al. | |
| 7,502,810 B2 | 3/2009 | Acevedo-Aviles et al. | |
| 2001/0037345 A1* | 11/2001 | Kiernan et al. | 707/513 |
| 2002/0091661 A1 | 7/2002 | Anick et al. | 707/1 |
| 2002/0091696 A1* | 7/2002 | Craft et al. | 707/10 |
| 2002/0111792 A1* | 8/2002 | Cherny | 704/8 |
| 2003/0079177 A1* | 4/2003 | Brintzenhofe et al. | 715/500 |
| 2004/0199545 A1* | 10/2004 | Wagner et al. | 707/104.1 |
| 2005/0071336 A1* | 3/2005 | Najork et al. | 707/8 |
| 2006/0106876 A1* | 5/2006 | MacGregor | 707/104.1 |
| 2006/0168538 A1* | 7/2006 | Stevens et al. | 715/779 |
| 2007/0118542 A1* | 5/2007 | Sweeney | 707/100 |
| 2007/0136221 A1* | 6/2007 | Sweeney et al. | 706/20 |
| 2008/0010264 A1* | 1/2008 | Morton et al. | 707/4 |
| 2008/0010276 A1* | 1/2008 | Morton et al. | 707/5 |
| 2008/0021925 A1* | 1/2008 | Sweeney | 707/104.1 |
| 2009/0265373 A1 | 10/2009 | Acevedo-Aviles et al. | |

OTHER PUBLICATIONS

Stoica et al., "Automating Creation of Hierarchical Faceted Metadata Structures," 2007, Association for Computational Linguistics, Proceedings of NAACL HLT 2007, pp. 244-251.*

Priss, Uta., "A Graphical Interface for Conceptually Navigating Faceted Thesauri", 1998, Indiana University, School of Library and Information Science, pp. 1-11.*

Priss, Uta. "Faceted Information Representation", 2000, Shaker Verlag, Working with Conceptual Structures. Proceedings of the 8 Conference on Conceptual Structures, pp. 84-94.*

Smith et al., "FacetMap: A Scalable Search and Browse Visualization," Sep./Oct. 2006, IEEE, Transactions on Visualization and Computer Graphics, vol. 12., No. 5, pp. 797-804.*

JavaServer Faces, Apr. 1, 2004, O'Reilley Media, pp. 1-18.

USPTO office action for U.S. Appl. No. 11/136,657 dated Oct. 29, 2007.

USPTO final office action for U.S. Appl. No. 11/136,657 dated May 12, 2008.

USPTO notice of allowance for U.S. Appl. No. 11/136,657 dated Oct. 28, 2008.

* cited by examiner

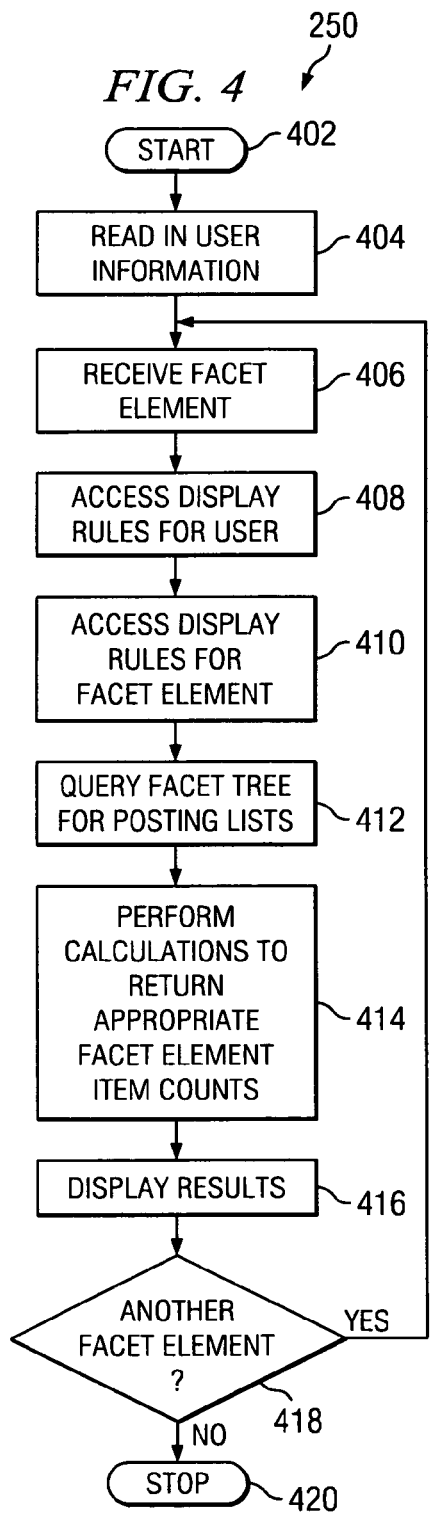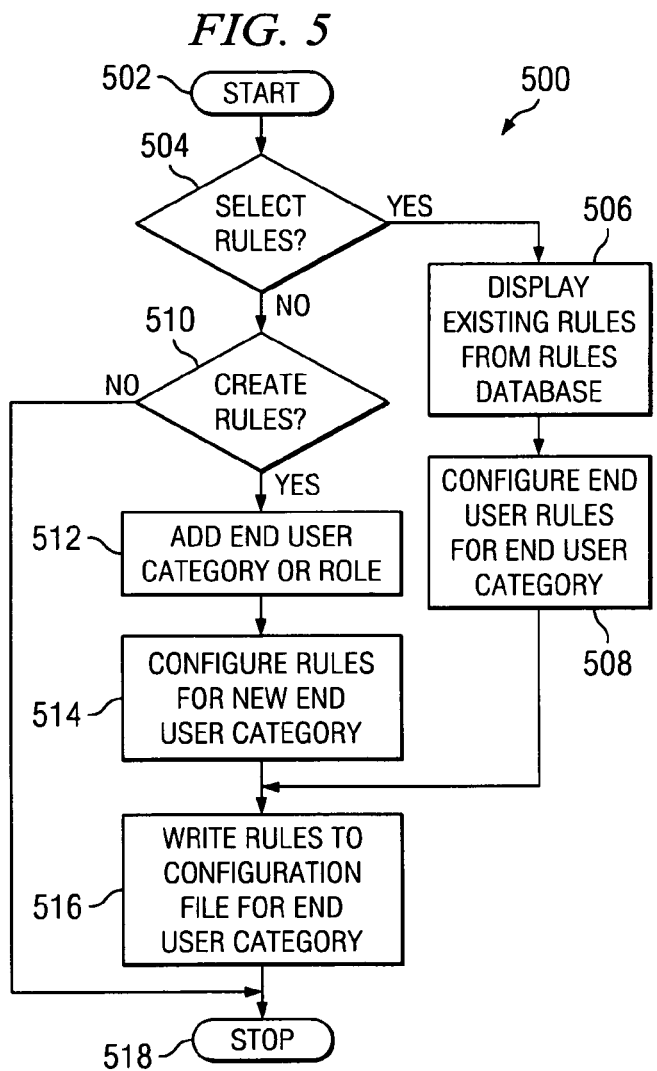

DISPLAYING FACET TREE ELEMENTS AND LOGGING FACET ELEMENT ITEM COUNTS TO A SEQUENCE DOCUMENT

CROSS-REFERENCE TO RELATED APPLICATION

The present invention is related to the subject matter of U.S. patent application Ser. No. 11/136,657, entitled "Method and apparatus for rapid tagging of elements in a facet tree," incorporated herein by reference.

FIELD OF THE INVENTION

The present invention is directed to database access in general, and to configuration of inverted indexes for faceted searching in particular.

BACKGROUND OF THE INVENTION

Vast amounts of digital information are available to users through the interconnection of computers and storage by the Internet. Indeed, traditional paper records can be scanned and retained electronically. Emails or instant messages between a company's engineers, planners, or financial officers can have the same or greater significance as formal memorandums or journal articles in a knowledge database. Although available in great quantity, digital information must be accessed in order to be used efficiently and profitably. Typical search methods use queries consisting of a Boolean combination of words and phrases which return documents containing words or phrases that match the search query. Imprecision and ambiguities in the words and phrases affect the effectiveness of searches. Refining a search takes time and skill and a user's search capability usually improves with practice and experience.

However, businesses need fast and reliable search capabilities that are not dependent on a user's skill and experience. Speed and reliability are improved by a search capability that precludes a null result. A null result occurs when desired information is not present in the data base, or the desired information is present, but the search term fails to locate the information. Speed and reliability are improved by a search that is controlled so that users are logically directed to the sought after information without distractions by non-relevant information. Thus the record count of documents responsive to a search should never be zero, and should include only documents that are relevant to the search.

In addition to speed and reliability, businesses need a search capability that can restrict accesses to portions of its digital information. For example, not all employees have a need to access all information. Trade Secret information, while part of the total universe of a business's digital information, must have access limited only to those with proper authorization. Moreover, one division of a corporation may not need access to another division's information. Employee files including health records and financial data must be protected in accordance with various State and Federal laws. Thus the need for information access with speed and reliability is affected by equally important needs to restrict access where appropriate.

Personnel responsible for organizing the universe of a businesses' digital information have found that a controlled search can be achieved by a faceted search using a facet tree. A facet tree is a categorization schemes for hierarchially structured data and content records where the facets and facet elements of the tree guide the search and a posting list of records is associated with each facet element. A facet is a node in the hierarchial network and a facet may have any number of facet elements. The total number of records in a facet is the sum total of all records in the posting lists of the facet elements beneath the facet in the facet tree.

A faceted search is conducted by a faceted search engine. Selection of a facet (a word or phrase) causes the faceted search engine to present the next set of facets, and so on along the facet tree until a final facet is reached and the facet elements are displayed. When the user selects one of the facet elements, the documents on the associated posting list are displayed. The relationship of the facets to each other and of the facets to the facet elements is created by tagging. In general, a tag is one or more characters attached to a set of data that contain information about the set, including its identification. By tagging is meant assigning a value to a facet so that it is identified with another facet in a hierarchical relationship and assigning a value to a facet element so that it is identified with a particular facet.

Current approaches to faceted search are based upon the tagging of data and facet elements in a strict parent/child relationship. Using a faceted search engine, end users choose one facet or facet element at a time. Document or data record counts are displayed in conjunction with the facet elements, such that the end users are aware of the total number of records and also how many data records exist at a given facet element within a facet. The total number of records means the number of records for all of the combined facets and facet elements that have been selected.

Faceted search has the advantage of eliminating null results when end users are searching for records across many combined dimensions. To do this, data records that are tagged to a facet element are also made available at facet levels. By way of example, a user might use a faceted search engine to locate content in geographical, industry, and technology facets by choosing "Europe," "Retail," and "Supply Chain" as facets. When one does this, all of the records in posting lists identified with the facets of Europe, Retail, and Supply Chain are aggregated and returned. The total number of records returned is the set intersection of all of the data records rolled up to Europe through Retail and Supply Chain.

Another form of faceted search is a conversational search. In a conversational search, end users are presented with a series of questions derived from or tagged to a facet hierarchy, and the answers given by the end users result in faceted responses rendered by a conversational search engine. The response may include search engine results at the record level finding, for example, documents, titles, abstracts, and other information about those documents. The response may also include navigation from the facet that the question was asked about, to a succeeding facet or facet element. In a conversational scheme, the semantic content of the questions matters, and so the order in which the questions are presented is important.

Facets are most often applied to inverted indexes. An inverted index is defined by the National Institute of Standards and Technology (NIST) as an "index into a set of texts of the words in the texts." NIST further states that "[e]ach index entry gives the word and a list of texts, possibly with locations within the text, where the word occurs." Thus when an inverted index is accessed by a search engine, a word can be located and its location in a text displayed. The index then is as large as the sum total of each single occurrence of an individual word in the texts in the database. In order to prepare the index for faceted search, index terms must be selected as facets or facet elements and the hierarchial relationship established by tagging a facet to another facet, a facet to a facet element, or a facet element to a posting list.

Businesses have a need to apply policies to tagging to meet requirements for restricted access for security and legal reasons, but also to apply policies to tagging to promote the efficiency of providing results to end users. Automated tagging algorithms exist such as the Eureka algorithm and software from IBM Research. Other automated tagging algorithms are known. For example, United States Patent Application 2002/0091661, entitled "Method and Apparatus for Automatic Construction of Faceted Terminological Feedback for Document Retrieval" (the '661 application), discloses a method for extracting key informational concepts or "facets" from a collection of documents. In the '661 application, facets are chosen heuristically based on 'lexical dispersion. As used in the '661 application, lexical dispersion is "a measure of the number of different words with which a particular word co-occurs within such syntactic contexts." The facets and their corresponding lexical constructs provide a structured summary of the contents of a result set.

However, these automated solutions rely on factors such as word frequency in a document and cannot tag documents in accordance with business rules. In order to tag data records and documents in accordance with a stated policy, a person must manually perform the tagging according to specific business rules. While algorithms are capable of approximating human tagging based on semantic categorization, they cannot perform tagging in accordance with policies. Additionally, each time a tagging policy changed, the algorithm would need to be changed. Therefore, although labor intensive, human tagging is necessary to make the policy distinctions that cannot be made by a machine.

Policies that affect tagging can be categorized as restriction policies and efficiency policies. Restriction policies include protection of trade secret and proprietary data, protection of data for legal requirements, permissions on who can create or alter a facet tree, permissions on who can view the original configuration of a facet tree that has been altered, and permissions on who can create or view an altered facet tree. Efficiency policies include rules regarding display of the data based on semantics (the specific facet under focus), display of the data based on end user characteristics, display of the data based on the kind of content, display of the data based upon validation by role (such as authoritative end users, content administrators, auditors, and so on), display of data that has been auto-tagged (shown unaltered with a warning message until validated), display of the facets in different sequences, and display of records based on currency. These two policy areas allow for any rules that a business may need to ensure that only those who need to access the records do so. In addition these two policy areas allow for rules to ensure that records will be displayed consistent with the business's requirements and best business practice policies.

One example of an efficiency policy is that companies need the ability to apply specific business rules, since some data elements are "tagged to" a child element, and thus should "count toward" the total number of data records for a parent element without actually being "displayed" at the parent data element level. A particular product, for example, may be sold in Europe because it is sold in France. From an end user search perspective, what is needed is an invention that allows for "counts" of search records to be aggregated to the parent level, while disallowing display of the records in a faceted search interface until the end user navigates to the appropriate child nodes. In other words, end users should be able to distinguish between facet elements that belong at different levels when necessary, and also to see all results when necessary.

One of the main issues with current faceted search implementations is that they do not allow those who "own" collections of faceted content to display results that are tagged in a case specific fashion. As explained in the above section, businesses often have a need to display documents or data records in a fashion that "counts membership" in a parent, while delineating those records so that the records are known not to apply at a particular parent level. In a business context, for example, a service provider may offer services in Florence, Italy. In standard faceted search implementations, records for the service provider are displayed for all of Italy, for the region of Tuscany, and for the city of Florence. Yet the service provider may offer services "only" in Florence, or at any of the specified levels of the given hierarchy. In some contexts, then, an end user searching a collection of service providers may wish to know that a certain number of child records or documents exist below the level either of Italy or of Tuscany, without viewing the child records, or at the very least by viewing the child records in a fashion that delineates their difference from records that "belong" at multiple levels of a hierarchy. Similarly, an owner of content or an administrative role may wish to enforce rules to disallow display of such items, even though they are present in the faceted counts of documents or data records for a given facet element. There is a need for administrative capability to specially configure display of facet results at the facet level by end user characteristic such as audience or role membership, or by combined facet and end user characteristics. Current approaches do not directly address this problem. The closest technical solution to the problem is Online Analytical Processing (OLAP) database technology, but such an approach encounters severe performance challenges due to the large number of relational joins required, and imposes design constraints on dimensions that are added to the OLAP database/storage.

Another example of an efficiency policy, is that current approaches to faceted search of web content provide very limited ability to conditionally reorder facets or facet elements, instead providing a single ordering for a given collection of content. While this is less of a problem for basic navigation through sets of contents tagged with facet elements, it becomes a very significant problem in other contexts. In the conversational scheme, facets are more than just navigational mechanisms to narrow a query or whittle down a result set. They are a mechanism by which end users provide data that is then saved and put to various uses. For example, facet sequences may be rendered in a conversational style so that end users may apply metadata to a set of documents or data records. Similarly, facet sequences can be provided to some administrative roles such that compliance with business rules may be verified in a particular order. Facet sequences may be provided to end users as a means of collecting input for problem determination. Finally, facet sequences are an important navigational alternative to showing all facets at the same level and allowing end users to navigate in any facet order. Because faceted navigation tends to exceed the contents that can be held by a single screen, users with limited screen space may need to scroll excessively. Consider, for example, a sales representative who accesses a corporate intranet via a PDA such as a Blackberry. A mechanism to present facets in a particular order would provide a much more manageable interface for such an end user, or perhaps any end user with limited screen space. Finally, an end user may need facets only in a particular order. Rather than navigating through the same set of questions again and again, end users in a conversational system should be able to arrange the "prompts" in one or more orderings of their choosing.

Therefore, a need exists for a way to configure the view of facets and for a mechanism that allows for quick specification, saving, and recall of a facet order.

SUMMARY OF THE INVENTION

The invention that meets the needs identified above is a set of programs comprising a web display interface program (WIP), a Display Configuration Program (DCP) and a Sequence Logging Program (SLP). Responsive to user actions, the set of programs provide instructions to a server connected to storage containing a facet tree database and a rules database.

The WIP comprises a user interface and a set of servlets. The user interface comprises one or more Java Server Pages (JSP's). The servlets read the facet element to be displayed from the facet tree database, and based upon the user characteristics, acquire the appropriate display rules for the user from the rules database. The servlets apply the rules to the facet tree before presentation to the user on the user interface so that the user sees only the portions of the facet tree allowed by the rules. Alternatively, the servlets provide a separate display screen and a button in a facet display screen that allows toggling between the original facet tree from the database and the particular views created by an administrator. In the case of an administrator, the servlets provide a separate configuration screen in which the administrator can select views so that rules can be created for the selected view by the DCP. The servlets allow the administrator to toggle between the original facet tree and the particular view created by the administrator for particular end users.

The DCP allows an administrator to select or configure rules that will establish views for different end users that are tailored to those particular end users. For example, rules may be selected to configure displays for end users in categories such as Sellers, Market Developers, Administrators, and Business Partners. Rules may be configured to a particular audience or a particular end user role. The mechanism to add audiences and roles is a standard Lightweight Directory Access Protocol (LDAP) component. When the administrator selects the appropriate rules, the CP writes the selected rules to a set of configuration files.

The SLP provides a means for end users to navigate through a set of facets using a standard faceted search, or using a previously constructed sequence of facets. The user's navigational choices are then logged into a sequence object in a file, a memory, or in a database, and stored for later use. A given end user may be shown a particular sequence of facets or facet elements based on their end user characteristics. End user characteristics may be accessed, for example, via a user login or a mechanism such as a cookie. End user characteristics may be based on the end user's choices, or on some other administrative decision. When finished navigating, the user may save the sequence, providing a name and other metadata such as the specific person or group for which the sequence is intended. The logged choices are written to a "sequence document" Extensible Markup Language (XML) file. The XML file is read in when an end user access the particular sequence. The sequence contains an identifier for each step in the facet sequence. End users are able to make choices until they decide to move to the next facet which they do by clicking on a button or link.

The facet tree database may contain an empty set of facets or a populated facet structure. An empty set of facets is a tree containing only facets and facet elements without any tagging of documents or records to facet elements. A populated facet structure is a facet tree in which documents or records have been tagged to the facet elements. In the case of a empty set of facets, the user may navigate through the facets by clicking on a toggle button, a link, or similar user interface, but because the facets are not populated with records, a separate set of programming logic is required to navigate the trees of facet elements. The navigation choices the end user makes changes in the display window. The end user may click a checkbox, link, or similar control to designate that they have chosen a facet element to be logged.

In the case of a populated facet structure, the user's choices are limited to those facet elements to which data has been tagged, allowing sequences of facet elements to be created for particular sets of content contained in a single inverted index, that index to be searched and presented to end users with a facet rendering engine.

These and other objects of the invention will be apparent to those skilled in the art from the following detailed description of a preferred embodiment of the invention.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 4 is a flowchart of the logic of the Web Interface Program (WIP);

FIG. 5 is a flowchart of the logic of the Display Configuration Program (DCP)

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software" refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Facet Configuration Program" (FCP).

As used herein, the term "inverted index" shall mean an index of words or phrases where each word or phrase in the index is associated with a list of texts, and each word or phrase is also associated with the location within each of the texts where the word or phrase occurs, so that when the inverted index is accessed by a search engine, each word or phrase in the index can be located and the location of the word or phrase in each of the texts containing the word phrase can be displayed. As used herein, the term "tagging" means assigning a value to a word or data record to (1) select the word as a facet or a facet element, (2) to link the facet or facet element to another to facet or facet element, or (3) to link a data record to a facet element. As used herein, the term "posting list" means one or more values assigned to a data record and linked to a facet element where the list of values will be displayed when the facet element is activated, and each of the data records will be displayed when the value in the posting list is activated. As used herein, the term "facet rendering engine" means a program that will display a file or inverted index that has been tagged as a facet tree.

Figure 1:
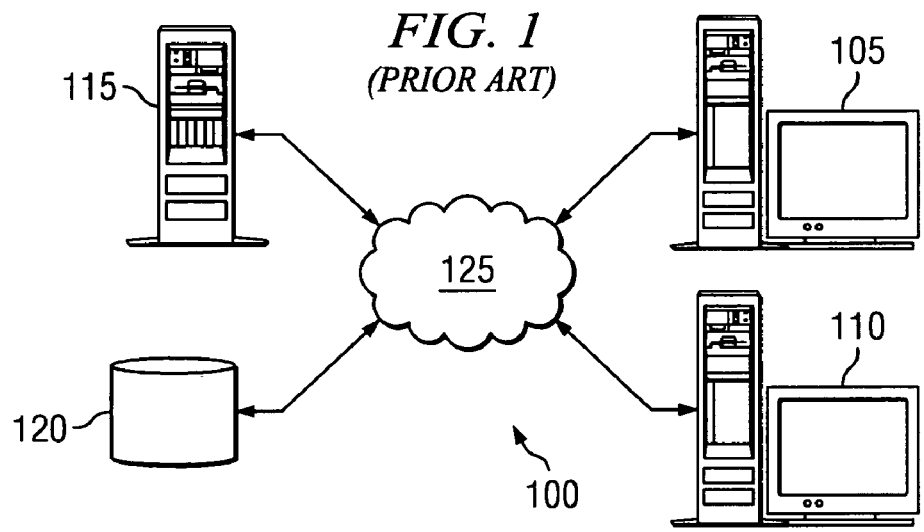
FIG. 1 represents a representative network in which the invention may be implemented.

Additionally, the FCP is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2A:
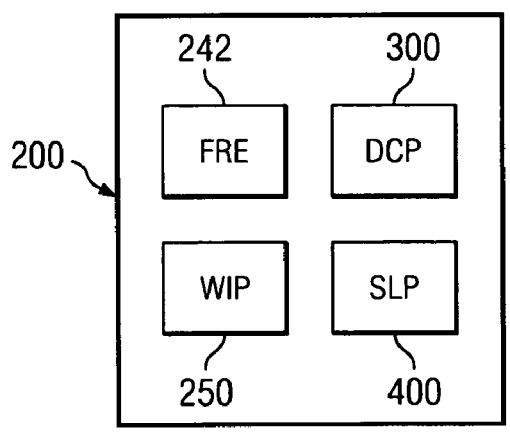
FIG. 2A represents storage in a server in which the invention resides.

WIP 250, DCP 300, and SLP 400 typically are stored in a memory, represented schematically as memory 200 in FIG. 2A. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 200. As depicted in FIG. 2A, memory 200 contains Web Interface Program (WIP) 250, Display Configuration Program (DCP) 300 and Sequence Logging Program (SLP) 400. Memory 200 further includes Facet Rendering Engine (FRE) (242).

Figure 2B:
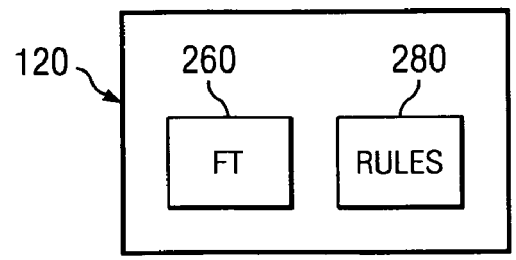
FIG. 2B represents storage connected to the server by the network and containing files and databases necessary to the invention.

DCP 300 interacts with a number of databases and files located on a representation of remote storage 120 depicted in FIG. 2B. Remote storage 120 contains facet tree database 260 and rules database 280.

Figure 3:
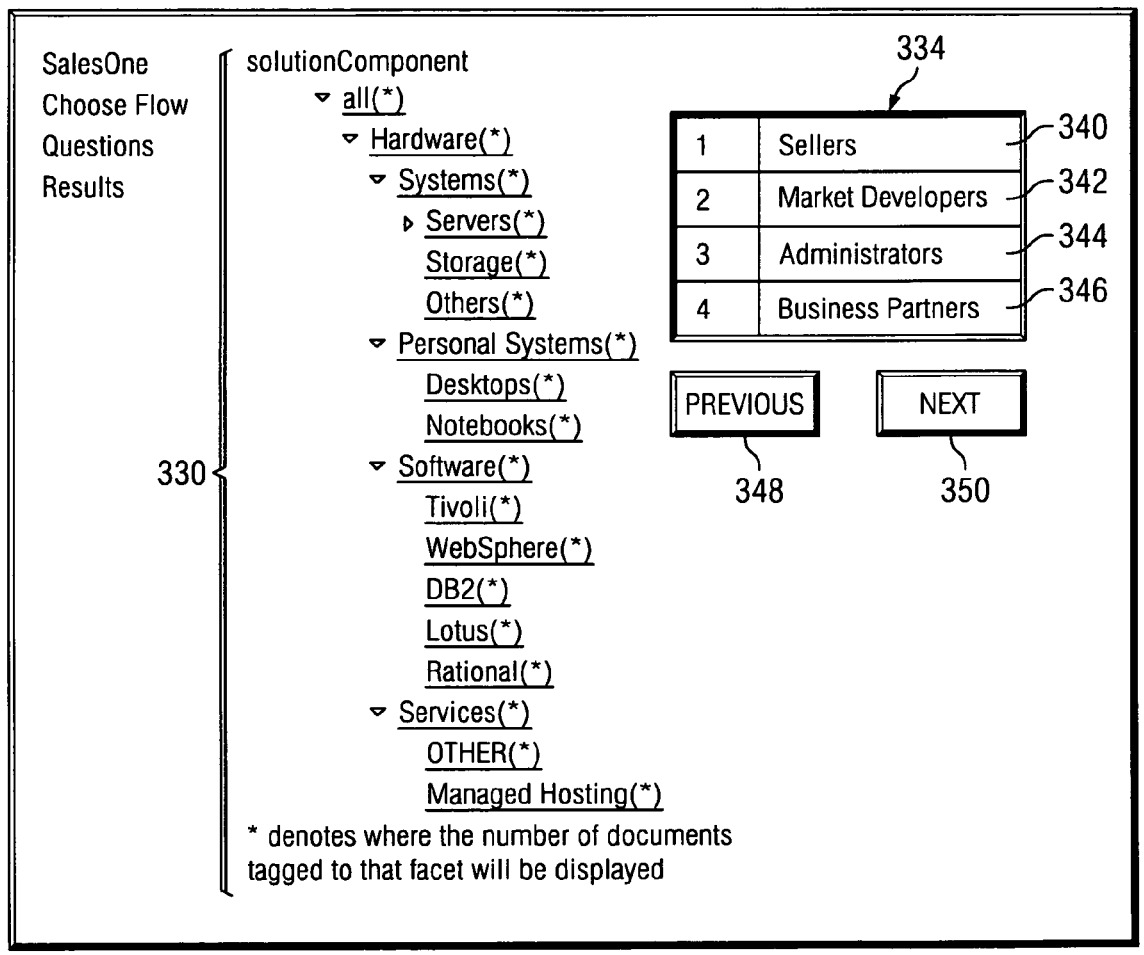
FIG. 3 represents a facet tree presented for tagging on a user interface of the invention.

FIG. 3 depicts user interface (UI) 320 displaying facet tree 330 labeled as solutionComponent and selection window 334 for specialized views of the facet tree. In the example, the user may choose Sellers 340, Market Developers 342, Administrators 344, and Business Partners 346. If the user selects Sellers 340 a facet tree will be displayed in accordance with rules for Sellers 340. If the user selects Market Developers a facet tree will be displayed in accordance with rules for Market Developers and so on. The user can toggle back and forth between views using the Previous (Prev) 348 and Next 350 buttons.

FIG. 4 depicts a flow chart of WIP 250. WIP 250 starts on the server on which WIP 250 resides (such as server 115 in network 100) (402), reads in user information (404), receives a facet element selected by the user (406), and accesses display rules applicable to the user (408). WIP 250 accesses display rules for the facet element (410), and queries the facet tree for posting lists applicable to the facet element (412). WIP 250 performs calculations to return appropriate facet element item counts (414) and displays the results (416). If the user desires to display another facet element (418), WIP 250 goes to step 406, and if not, WIP 250 stops (420).

FIG. 5 depicts a flow chart of DCP 300. DCP 300 starts (502) and determines whether the user wants to select rules from the existing rules database (504). If so, DCP 300 displays the existing rules from the rules database (506), the user selects rules to configure an end user category (508), and DCP 300 goes to step 516. If the user did not want to select rules, DCP 300 determines whether the user desires to create rules (510). If so, the user adds an end user category or role (512), configures rules for the new end user category or role (514), and DCP 300 goes to step 516. At step 516, DCP 300 writes the rules to a configuration file for the end user category (516). After step 516, or after a negative response at step 510, DCP 300 stops (518).

Figure 6:
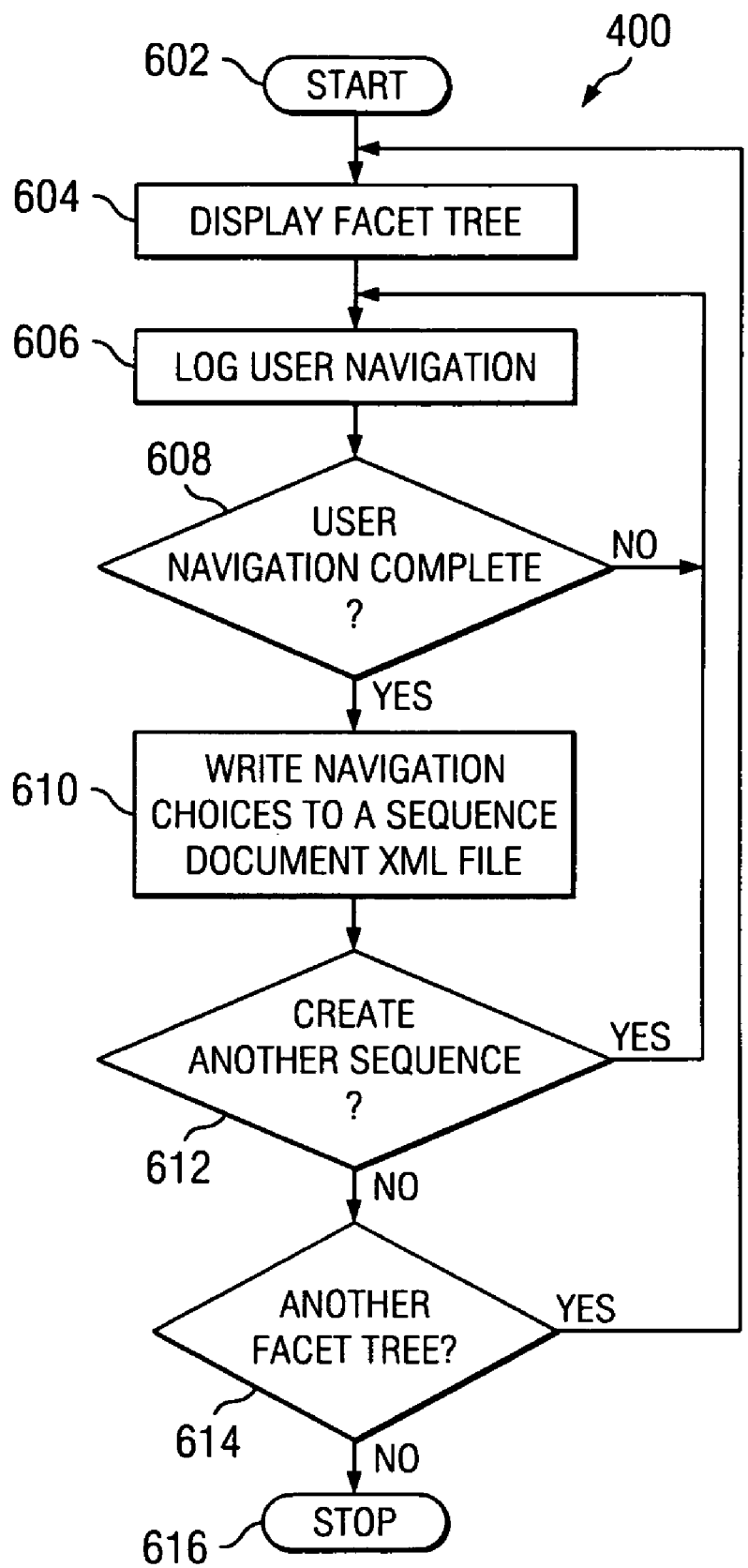
FIG. 6 is a flowchart of the logic of the Sequence Logging Program (SLP).

FIG. 6 depicts a flow chart of SLP 400. SLP 400 begins (602) and displays a selected facet tree (604) on a configuration display. The user navigates the selected facet tree and SLP 400 logs the user selections (606). SLP 400 determines whether the user navigation is complete (608), and if so SLP 400 writes the navigation choices to a sequence document XML file (610). If the navigation is not complete, SLP 400 continues to log user navigation (606). SLP 400 determines whether the user wants to create another sequence (612). If so, SLP 400 goes to step 606. If not, SLP 400 determines whether the user wants to display another facet tree (614). If so, SLP 400 goes to step 604. If not, SLP 400 stops (616).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer-implemented method for controlling a display of facet tree elements, the method comprising providing a plurality of instructions to a computer connected to a storage device containing a rules database and a facet tree database, wherein the plurality of instructions are adapted to cause the computer to perform steps comprising:

displaying a user interface for selecting a facet tree from a plurality of facet trees and selecting a user category from a plurality of categories;

responsive to a user's selections of the facet tree and the user category, acquiring a set of display rules applicable to a user characteristic from the rules database;

prior to displaying a specialized view of the facet tree, applying the set of display rules to the facet tree and performing calculations to return an appropriate facet element item count in each of a plurality of elements from the facet tree;

displaying a specialized view of the facet tree that includes the appropriate facet element item count, wherein the specialized view is configured such that only those portions of the facet tree to which the user is authorized access by the set of display rules associated with the user characteristic are displayed to the user on the interface; and logging a plurality of navigation choices and the appropriate facet element item count in each of a plurality of elements from the facet tree to a sequence document.

2. The computer-implemented method of claim 1, wherein logging the navigation choices further comprises receiving a sequence comprising a plurality of choice inputs in response to user navigation of the specialized view and further logging the plurality of navigation choices in response to the user specifying a specific person or a group for which the sequence is intended.

3. The computer-implemented method of claim 1, wherein the sequence document is an Extensible Markup Language file.

4. The computer-implemented method of claim 1, further comprising:
responsive to a user triggering an activation device, toggling between an original facet tree from the facet tree database and the particular view of the facet tree.

5. The computer-implemented method of claim 1, further comprising:
wherein the plurality of categories comprise: a sellers category, a market developers category, an administrators category, and a business partners category.

6. An apparatus for controlling display of facet tree elements comprising a computer connected to a storage containing a rules database and a facet tree database and a program in the storage containing a plurality of instructions adapted to cause the computer to perform steps comprising:
providing a plurality of instructions to a computer connected to a storage device containing a rules database and a facet tree database, wherein the plurality of instructions are adapted to cause the computer to perform steps comprising:
displaying a user interface for selecting a facet tree from a plurality of facet trees and selecting a user category from a plurality of categories;
responsive to a user's selections of the facet tree and the user category, acquiring a set of display rules applicable to a user characteristic from the rules database;
prior to displaying a specialized view of the facet tree, applying the set of display rules to the facet tree and performing calculations to return an appropriate facet element item count in each of a plurality of elements from the facet tree;
displaying a specialized view of the facet tree that includes the appropriate facet element item count, wherein the specialized view is configured such that only those portions of the facet tree to which the user is authorized access by the set of display rules associated with the user characteristic are displayed to the user on the interface; and
logging a plurality of navigation choices and the appropriate facet element item count in each of a plurality of elements from the facet tree to a sequence document.

7. The apparatus of claim 6, wherein logging the navigation choices further comprises receiving a sequence comprising a plurality of choice inputs in response to user navigation of the specialized view and further logging the plurality of navigation choices in response to the user specifying a specific person or a group for which the sequence is intended.

8. The apparatus of claim 6, wherein the sequence document is an Extensible Markup Language file.

9. The apparatus of claim 6, wherein the plurality of instructions are further adapted to cause the computer to perform steps comprising:
responsive to a user triggering an activation device, toggling between an original facet tree from the facet tree database and the particular view of the facet tree.

10. The apparatus of claim 6, further comprising:
wherein the plurality of categories comprise: a sellers category, a market developers category, an administrators category, and a business partners category.

11. A computer program product for controlling display of facet tree elements comprising a computer readable medium, wherein the computer readable medium contains a plurality of instructions adapted to cause a computer connected to a storage containing a rules database and a facet tree database to perform steps comprising:
providing a plurality of instructions to a computer connected to a storage device containing a rules database and a facet tree database, wherein the plurality of instructions are adapted to cause the computer to perform steps comprising:
displaying a user interface for selecting a facet tree from a plurality of facet trees and selecting a user category from a plurality of categories;
responsive to a user's selections of the facet tree and the user category, acquiring a set of display rules applicable to a user characteristic from the rules database;
prior to displaying a specialized view of the facet tree, applying the set of display rules to the facet tree and performing calculations to return an appropriate facet element item count in each of a plurality of elements from the facet tree;
displaying a specialized view of the facet tree that includes the appropriate facet element item count, wherein the specialized view is configured such that only those portions of the facet tree to which the user is authorized access by the set of display rules associated with the user characteristic are displayed to the user on the interface; and
logging a plurality of navigation choices and the appropriate facet element item count in each of a plurality of elements from the facet tree to a sequence document.

12. The computer program product of claim 11, wherein logging the navigation choices further comprises receiving a sequence comprising a plurality of choice inputs in response to user navigation of the specialized view and further logging the plurality of navigation choices response to the user specifying a specific person or a group for which the sequence is intended.

13. The computer program product of claim 11, wherein the sequence document is an Extensible Markup Language file.

14. The computer program product of claim 11, wherein the plurality of instructions are further adapted to cause the computer to perform steps comprising:
responsive to a user triggering an activation device, toggling between an original facet tree from the facet tree database and the particular view of the facet tree.

15. The computer program product of claim 1, further comprising:
wherein the plurality of categories comprise: a sellers category, a market developers category, an administrators category, and a business partners category.

* * * * *